Aug. 25, 1964  C. E. LAY  3,145,406
COUPLING CONNECTOR FOR DETACHABLE MOPS AND THE LIKE
Filed June 22, 1961
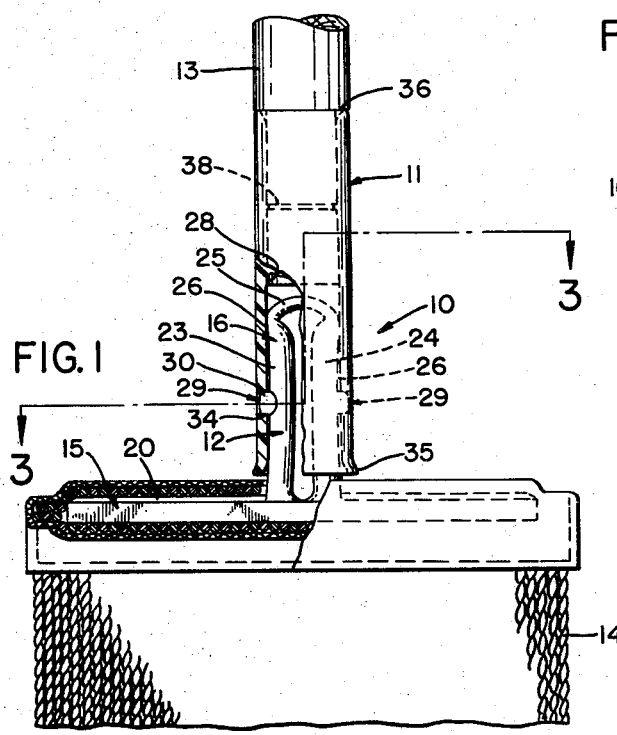
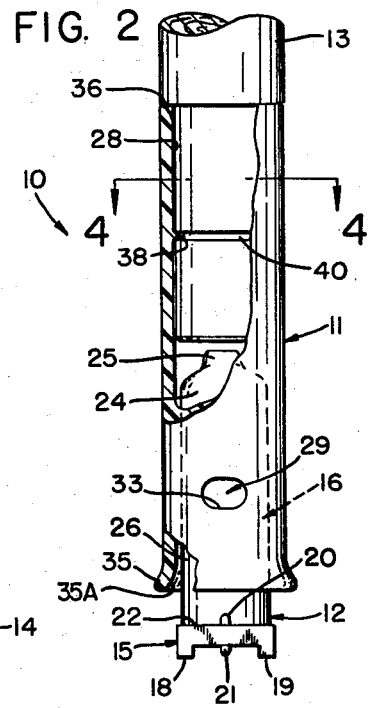
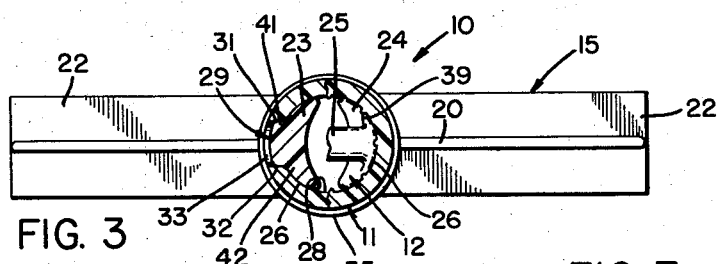
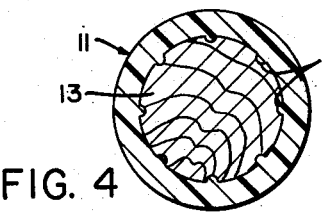
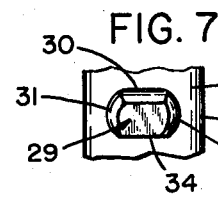
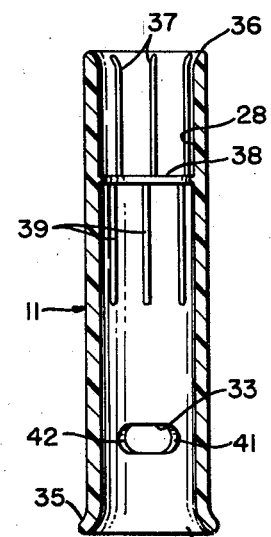
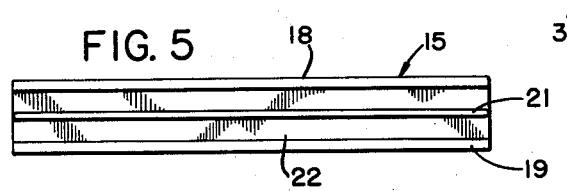
*INVENTOR.*
CARLTON E. LAY
BY *Ely, Frye & Hamilton*
ATTORNEYS _United States Patent Office_

3,145,406
Patented Aug. 25, 1964

3,145,406
COUPLING CONNECTOR FOR DETACHABLE MOPS AND THE LIKE
Carlton E. Lay, 2617 Robindale Ave., Akron 12, Ohio
Filed June 22, 1961, Ser. No. 118,800
9 Claims. (Cl. 15—147)

The present invention relates to an improved implement used in connection with brushing, scrubbing and general cleaning. More particularly, the present invention relates to an improved coupling connector for joining a detachable mop head and the like to a handle.

The advantages of a mop having a detachable and disposable head are set forth in the applicant's U.S. Patent No. 3,008,166, which issued from copending application Serial No. 6,262, filed February 2, 1960.

The feasibility of a detachable mop construction is greatly augmented by the particular coupling structure used. Complex coupling connectors which must be laboriously bolted together are far too time consuming and elaborate for practical use. Fast-make couplings, as known from the prior art, which eliminate the excessive time consumed in making the connection are either too elaborate or do not effect a sufficiently secure connection because they permit the handle to rotate independently of the mop head.

It is therefore a primary object of the present invention to provide a coupling connector for a mop having a detachable head which can be rapidly joined or separated and which securely maintains the two connecting components of the assembly nonrotatably together.

It is a further object of the present invention to provide a fast-make coupling connector which can be manufactured at such a low cost that the component thereof secured into the mop head can be disposable therewith.

It is a further object of the present invention to provide a fast-make coupling in which one component can be permanently, nonrotatably attached to the handle without rivets, bolts or other extraneous devices.

In general, a coupling connector according to the present invention comprises a handle portion and a head portion. A series of ribs on the interior of the handle portion secure this portion rigidly to the handle. The lower section of this handle portion is adapted to be grippingly interlocked with a cooperative section of the head portion. One of said sections comprises a flexible bayonet with cammed locking lugs and the other of said sections comprises a cylindrically bored receptacle into which said bayonet is grippingly inserted. Lug receiving niches are recessed into the interior surface of the receptacle to lockingly engage the lugs on the bayonet. The side walls of the niches are cammed for cooperative engagement with the cammed surfaces on the lugs to provide a means for disconnecting the coupling. The remainder of the head portion comprises a shoe on which the mop strands are supported or other cleaning apparatus.

Referring to the drawings:

FIG. 1 is an elevation partly broken away of a mop employing a coupling connector according to the present invention;

FIG. 2 is an enlarged elevation partly broken away taken at 90° to the elevation of FIG. 1 and with the mop strands not shown;

FIG. 3 is an enlarged cross section taken substantially on line 3—3 of FIG. 1 but with the mop head removed;

FIG. 4 is a further enlarged cross section taken substantially on line 4—4 of FIG. 2;

FIG. 5 is a bottom plan view of the shoe section of the mop head supporting portion on which the mop strands are supported;

FIG. 6 is a detached cross section taken longitudinally through the handle portion of the coupling connector according to the present invention;

FIG. 7 is an enlarged fragmentary detached view of the bayonet showing the cammed locking lugs in frontal elevation; and FIG. 8 is a side elevation of the cammed locking lugs shown in FIG. 7.

A coupling connector, indicated generally by the numeral 10, according to the present invention, includes a handle portion 11 and a head portion 12. A suitable handle 13 may be secured to the handle portion 11 and a mop head 14 may be secured to the head portion 12. The mop head 14 is sewn around a shoe 15 which extends in opposite directions from the base of a bayonet 16. The applicant's U.S. Patent No. 3,008,166 discloses a preferred form of disposable mop head and its attachment to a shoe 15. The economic practicability of permitting the mop head 14 to be disposable is enhanced by making the head portion 12 out of a relatively inexpensive material, such as a rigid polypropylene.

Polypropylene is an especially suitable material from which to manufacture the entire connector because of its high strength-to-weight ratio. Polypropylene has high tensile strength and hardness. Because these qualities are not lost at elevated temperatures, polypropylene is unaffected by hot cleaning water and will even withstand temperatures incident to steam sterilization. Moreover, polypropylene is exceptionally resistant to moisture as well as solvents, greases, oils and other chemicals that would normally be contacted by a mop.

By fashioning the shoe to have a channel-like cross section with two depending legs 18 and 19 and an upper rib 20 and a lower rib 21 extending longitudinally of the shoe 15 along the web-like portion 22, the resiliency of the shoe is effectively controlled to permit "heeling" of the mop. That is, the mop may be used with the shoe disposed in a plane perpendicularly oriented with respect to the surface being cleaned. This is particularly useful in removing localized concentrations of dirt.

The remainder of the head portion 12 comprises one component of the coupling connector 10, and though it may be either a male or female component, it is preferably a male bayonet section 16, as shown. The bayonet 16 has two legs 23 and 24 which extend perpendicularly outwardly from the shoe 15 in substantially parallel configuration and are joined at their outermost or upper ends by a preferably bowed bridge 25 and fixed at the other, or inner ends, in spaced relationship. The width of each leg 23 and 24 is preferably substantially equal to the width of shoe 15. The bowed bridge 25 stabilizes the legs without sacrifice of the resiliency required to intentionally attach and detach the bayonet from a cylindrical bore 28 in the handle portion 11, as is more fully hereinafter described. The stability imparted by bridge 25 may be particularly critical when "heeling" the mop. Otherwise, the force applied to the edge of the mop during a "heeling" operation will force the legs together sufficiently to inadvertently disengage the bayonet from its receptacle.

The outer surface 26 of each leg 23 and 24 is of cylindrical section conforming to the interior surface of the ferrule-like receptacle 28 of the handle portion 11. A locking lug 29 protrudes outwardly from each cylindrical surface 26. The upwardly facing side 30 of each lug 29 is beveled or cammed for ease of making the connection. The lateral sides 31 and 32 of each lug 29 are similarly beveled or cammed to facilitate disconnecting the coupling—i.e., they converge outwardly from the leg. The downwardly facing side 34 of each lug 29—i.e., the side away from the insertable or bridge end of the legs—is disposed perpendicularly to the leg.

When the two portions 11 and 12 of the coupling connectors are locked together each lug 29 is received in a suitably shaped niche or bore 33 in receptacle section 28 of handle portion 11.

The lower end of receptacle 28 terminates in a radially outwardly flared circumferential lip 35 which provides a guide surface 35A on the inner side of the lip.

The upper end 36 of the handle portion 11 is also slightly flared or chamfered and has a plurality of axially or longitudinally disposed ribs 37 circumferentially spaced around the inner surface of the ferrule-like section and extending downwardly, terminating in proximity to an annular rib 38. A plurality of axially or longitudinally disposed ribs 39 extend downwardly from annular rib 38 to approximately the innermost distance the handle 13 is inserted. The upper set of ribs 37 are preferably circumferentially offset from the lower set of ribs 39. The lower end of handle 13 is inserted into the upper end of handle portion 11 and is securely and firmly engaged by the ribs 37, 38 and 39. The longitudinal ribs 37 and 39 furrow into the handle as it is inserted until annular rib 38 seats in annular groove 40 extending around the handle 13 to complete the secure connection between handle 13 and handle portion 11. Ribs 39 may be longitudinally aligned with ribs 37. However, it has been found that a more rigid connection is obtained when they are circumferentially offset, as shown and described. The connection thus made provides a nonrotatable, permanent, rigid connection between the handle 13 and the handle portion 11 which is extremely uncomplex and inexpensive to manufacture and assemble.

When the handle 13 secured to the handle portion 11 and the mop head 14 supported on shoe 15, the upper or insertable end of the bayonet is inserted into the lower end of handle portion 11. The cammed edge 30 of lug 29 engages the guide surface 35A and as the bayonet is forcibly further inserted at least the medial portion of the legs 23 and 24 are flexibly forced together to permit accommodation of the lugs 29 within the inner diameter of the receptacle 28. When the lugs are aligned with the niches 33 the legs snap the lugs into locking engagement therewith.

With the bayonet connection thus made the mop becomes unitary with the handle so that a twist of the handle will correspondingly twist the mop. Furthermore, the connection is sufficiently rigid that the coupling cannot be accidentally disconnected. For example, the perpendicular disposition of side 34 of each lug 29 to its corresponding leg assists in preventing an axial separation of the coupling portions inadvertently, as when the mop head is being pulled through a wringer by application of axial force to the handle.

To separate the detachable mop head from the handle, the operator grasps the shoe 15 firmly in one hand and the handle with the other. Or the operator may prefer to place the mop head on the floor with the handle upright. In this position he places one foot on the shoe and grasps the handle with both hands. With the leverage available by either method he can effect a sudden counter-rotation of the receptacle and bayonet in order to cause either surface 31 or 32 of the lug 29 to act against the corresponding surfaces 41 or 42, which may also be cammed, in the niches 33 so that the legs are flexibly forced together to accommodate the lugs 29 within the inner diameter of the receptacle 28. Thereafter, it is relatively easy to withdraw the bayonet from the receptacle axially.

It should be apparent from the foregoing description that a coupling according to the present invention provides an inexpensive fast-make bayonet coupling connector for a mop with a detachable head which can be rapidly joined or separated and which maintains the handle and the mop securely together.

What is claimed is:

1. A coupling connector for a cleaning implement having a handle and a detachable head, said coupling connector comprising two portions adapted to grippingly interlocked, one of said portions having a cylindrically bored receptacle, a flared lip on the end of said receptacle presenting a guiding surface, the other of said portions having a bayonet for mating engagement within said receptacle, said bayonet comprising parallel flexible legs, said legs at the inner end of said bayonet being fixed in spacial relationship, the outer surface of each leg being of cylindrical section, said legs adapted to be insertably received within said receptacle, a bridge joining the insertable ends of said legs, locking lugs projecting transversely outwardly of said legs, cammed surfaces defining the lateral edges of each of said lugs, a niche for each of said lugs recessed into the interior surface of said receptacle and adapted lockingly to engage said lugs, a cammed surface transversely of said bayonet defining the side of said lug toward the insertable end of said bayonet, the transverse cammed surface on each said lug cooperatively engaging the guiding surface of said receptacle lip for insertion of said bayonet into said receptacle.

2. A coupling connector for a mop having a handle and a detachable mop head, said coupling comprising a handle portion and a head portion, said handle portion having a cylindrically bored ferrule-like section, the inner diameter of said ferrule-like section being equivalent to the outer diameter of an insertable portion of a handle, a plurality of longitudinally disposed ribs on the inner surface of said ferrule-like section, an annular rib on the inner surface of said ferrule-like section adapted to engage a handle when positioned within said handle portion, one of said portions having a cylindrically bored receptacle, the other said member having a bayonet for mating engagement within said receptacle, said bayonet comprising flexible legs adapted to be insertably received within said receptacle, locking lugs projecting transversely outwardly of said legs, a niche for each of said lugs recessed into the interior surface of said receptacle and adapted lockingly to engage said lugs.

3. A coupling connector for a mop having a handle and a detachable mop head, said coupling comprising a handle portion and a head portion, said handle portion having a cylindrically bored ferrule-like section, the inner diameter of said ferrule-like section being equivalent to the outer diameter of an insertable portion of a handle, a plurality of longitudinally disposed ribs on the inner surface of said ferrule-like section, an annular rib on the inner surface of said ferrule-like section adapted to engage a handle when positioned within said handle portion, one of said members having a cylindrically bored receptacle, the other said member having a bayonet for mating engagement within said receptacle, said bayonet comprising parallel flexible legs, the outer surface of each being of cylindrical section and adapted to be insertably received within said cylindrically bored receptacle, locking lugs projecting transversely outwardly of said legs, cammed surfaces defining the lateral edges of each of said lugs, a niche for each of said lugs recessed into the interior surface of said receptacle and adapted lockingly to engage said lugs.

4. A coupling connector for a mop having a handle and a detachable mop head, said coupling comprising a handle portion and a head portion, said handle portion having a cylindrically bored ferrule-like section adapted to receive one end of a handle, a plurality of longitudinally disposed ribs spaced circumferentially around the inner surface of said ferrule-like section, an annular rib medially the ends of said longitudinally disposed ribs, the ribs between the open end of said ferrule-like section and said annular rib circumferentially offset from said axially disposed ribs on the other side of said annular rib, one of said portions having a cylindrically bored receptacle, the other said member having a bayonet for mating engagement within said receptacle, said bayonet comprising parallel flexible legs, the outer surface of each being of cylindrical section and adapted to be insertably received within said cylindrically bored receptacle, locking lugs projecting transversely outwardly of said legs, cammed surfaces defining the lateral edges of each of said lugs, a niche for each of said lugs recessed into the interior surface of said receptacle and adapted lockingly to engage said lugs.

5. A coupling connector for a mop having a handle and a detachable mop head, said coupling comprising a handle portion and a head portion, said handle portion having a cylindrically bored ferrule-like section adapted to receive a handle, a plurality of longitudinally disposed ribs spaced circumferentially around the inner surface of said ferrule-like section, an annular rib medially the ends of said longitudinally disposed ribs, the ribs between the open end of said ferrule-like section and said annular rib circumferentially offset from the ribs on the other side of said annular rib, one of said portions having a cylindrically bored receptacle, a flared lip on the end of said receptacle presenting a guiding surface, the other of said members having a bayonet for mating engagement within said receptacle, said bayonet comprising parallel flexible legs, the outer surface of each leg being of cylindrical section, each said leg having an end adapted to be insertably received within said receptacle, a bowed bridge joining the insertable ends of said legs, locking lugs projecting transversely outwardly of said legs, cammed surfaces defining the lateral edges of each of said lugs, a niche for each of said lugs recessed into the interior surface of said receptacle and adapted lockingly to engage said lugs, the circumferentially spaced walls of each said niche adapted for cooperative engagement with the correspondingly cammed surfaces on said lugs, a transverse cammed surface defining the side of each said lug toward the insertable end of said bayonet, the transverse cammed surface on each said lug cooperatively engaging the guiding surface of said receptacle lip for insertion of said bayonet into said receptacle, the surface of each said lug away from the insertable ends of said legs being perpendicularly disposed with respect to said legs.

6. A coupling connector for a mop having a handle and a detachable head, said coupling comprising a cylindrically bored handle portion and a head portion, one end of said bored handle portion adapted engagingly to receive a handle, longitudinally disposed ribs circumferentially spaced around the inner surface of said handle receiving end, an annular rib on the inner surface of said handle receiving end, said annular rib adapted to seat in an annular groove and said longitudinal ribs adapted to furrow in a handle when a handle is positioned within said handle portion, the other end of said handle portion having at least two niches recessed into the interior surface of said cylindrically bored portion, said head portion having a shoe adapted to support a plurality of mop strands, parallel flexible legs extending transversely outwardly of said shoe, the outer surface of each said leg being of cylindrical section and adapted to be insertably received within said cylindrically bored handle portion, locking lugs extending transversely outwardly of said legs, cammed surfaces defining the lateral edges of each of said lugs, each of said lugs adapted to be lockingly engaged within a corresponding niche, the circumferentially spaced walls of each said niche adapted for cooperative engagement with the corresponding lateral cammed surfaces on said lugs.

7. A coupling connector for a mop having a handle and a detachable head, said coupling comprising a cylindrically bored handle portion and a head portion, one end of said bored handle portion adapted engagingly to receive a handle, axially disposed ribs circumferentially spaced around the inner surface of said handle receiving end, an annular rib on the inner surface of said handle receiving end medially the ends of said axially disposed ribs, the axially disposed ribs on one side of said annular rib being circumferentially offset from the ribs on the other side of said annular rib, the other end of said handle portion having a flared lip and at least two niches recessed into the interior surface of said cylindrically bored portion, a guiding surface on said flared lip, said head portion having a bayonet and a channeled shoe adapted to support a plurality of mop strands, strengthening ribs longitudinally of said shoe, said bayonet comprising parallel flexible legs extending transversely of said shoe each said leg having an end adapted to be inserted within said cylindrically bored handle portion, the outer surface of each said leg being of cylindrical section, a bowed bridge joining the insertable ends of said legs, locking lugs extending transversely outwardly of said cylindrical surface, cammed surfaces defining the lateral edges of each of said lugs, each of said lugs adapted to be lockingly engaged within a corresponding niche, the circumferentially spaced walls of each said niche cammed for cooperative engagement with the corresponding cammed lateral surfaces on said lugs, a cammed surface transversely of said legs defining the side of said lug toward the insertable end of said bayonet, the transverse cammed surface on each of said lugs cooperatively engaging the guiding surface of said flared lip for insertion of said bayonet into said handle portion, the surface of each said lug away from the insertable ends of said legs perpendicularly disposed to said legs for mating engagement with a corresponding wall of said niche.

8. A coupling connector for attaching a cleaning head to a handle, said coupling connector comprising, two portions adapted to be grippingly interlocked, one said portion having a cylindrical receptacle, the other said portion having a pair of spaced apart parallel flexible legs forming a bayonet, said legs at one end of said bayonet being fixed in spaced relationship, said legs at the other end of said bayonet being joined by a bridge, the end of said bayonet at which said bridge is located being insertably received within said receptacle, locking lugs projecting transversely outwardly of said legs, cammed surfaces defining the lateral edges of each of said lugs, a niche for each of said lugs recessed into the interior surface of said receptacle and adapted lockingly to engage said lugs.

9. A coupling connector for a cleaning implement having a handle and a head, said coupling connector comprising, two portions adapted to be grippingly interlocked, one said portion having a cylindrical receptacle, a flared lip defining the end of said receptacle and presenting a guiding surface, the other said portion having a pair of spaced apart parallel flexible legs forming a bayonet, said legs at one end of said bayonet being fixed in spaced relationship, said legs at the other end of said bayonet being joined by a bridge, the end of said bayonet at which said bridge is located being insertably received within said receptacle, locking lugs projecting transversely outwardly of said legs, cammed surfaces defining the lateral edges of each of said lugs, a cammed surface defining the side of said lug toward the insertable end of said bayonet, the last mentioned cammed surface on said lug cooperatively engaging the guiding surface on said receptacle lip to permit insertion of said bayonet into said receptacle, a niche for each of said legs recessed into the interior surface of said receptacle and adapted lockingly to engage said lugs.

References Cited in the file of this patent

UNITED STATES PATENTS

| 64,654 | Floyd | May 14, 1867 |
|---|---|---|
| 1,085,164 | Rumans | Jan. 27, 1914 |
| 1,236,678 | Crawford | Aug. 14, 1917 |
| 1,441,455 | Rudall | Jan. 9, 1923 |
| 1,656,948 | Mays | Jan. 24, 1928 |
| 1,720,344 | Palmer | July 9, 1929 |
| 1,963,462 | Brock | June 19, 1934 |
| 2,898,619 | Beck | Aug. 11, 1959 |
| 2,973,540 | Saenz | Mar. 7, 1961 |
| 2,982,586 | Gliebe | May 2, 1961 |
| 2,990,205 | Weisser | June 27, 1961 |

UNITED STATES PATENT OFFICE
CERTIFICATE OF CORRECTION

Patent No. 3,145,406                                    August 25, 1964

Carlton E. Lay

It is hereby certified that error appears in the above numbered patent requiring correction and that the said Letters Patent should read as corrected below.

Column 3, line 60, for "surfaces" read -- surface --; line 75, after "to" insert -- be --.

Signed and sealed this 22nd day of December 1964.

(SEAL)
Attest:

ERNEST W. SWIDER                                    EDWARD J. BRENNER
Attesting Officer                                       Commissioner of Patents